United States Patent
Shalkey

[11] Patent Number: 6,080,348
[45] Date of Patent: Jun. 27, 2000

[54] MODIFIED SLOT EXTRUSION DIE

[75] Inventor: Mark A. Shalkey, Corning, N.Y.

[73] Assignee: Corning Incorporated, Corning, N.Y.

[21] Appl. No.: 09/162,115

[22] Filed: Sep. 28, 1998

Related U.S. Application Data

[60] Provisional application No. 60/062,309, Oct. 17, 1997.

[51] Int. Cl.⁷ .................................................. B29C 47/30
[52] U.S. Cl. ............................. 264/177.12; 264/177.12; 264/630; 425/461; 425/463
[58] Field of Search ............................. 264/177.12, 630; 425/463, 461, 462

[56] References Cited

U.S. PATENT DOCUMENTS

| | | | |
|---|---|---|---|
| 2,526,423 | 10/1950 | Rudorff . | |
| 3,038,201 | 6/1962 | Harkenrider . | |
| 3,790,654 | 2/1974 | Bagley . | |
| 3,885,977 | 5/1975 | Lachman et al. . | |
| 3,905,743 | 9/1975 | Bagley . | |
| 4,205,213 | 5/1980 | Inoue . | |
| 4,233,486 | 11/1980 | Inoue . | |
| 4,259,057 | 3/1981 | Abe et al. | 425/463 |
| 4,373,895 | 2/1983 | Yamamoto et al. | 264/177.12 |
| 4,403,131 | 9/1983 | Cunningham et al. . | |
| 4,527,035 | 7/1985 | Majestic . | |
| 4,780,075 | 10/1988 | Ozaki et al. | 425/463 |
| 4,883,420 | 11/1989 | Ozaki et al. | 264/177.12 |
| 4,902,216 | 2/1990 | Cunningham | 425/463 |
| 4,992,233 | 2/1991 | Swaroop et al. . | |
| 5,011,529 | 4/1991 | Hogue et al. . | |
| 5,320,721 | 6/1994 | Peters . | |
| 5,322,599 | 6/1994 | Peters . | |
| 5,507,925 | 4/1996 | Brew . | |
| 5,702,659 | 12/1997 | Kragle et al. | 264/177.12 |
| 5,876,804 | 3/1999 | Kodama et al. | 425/463 |
| 5,964,020 | 10/1999 | Kragle et al. | 425/463 |

FOREIGN PATENT DOCUMENTS

| | | |
|---|---|---|
| 0 228 258 | 7/1987 | European Pat. Off. . |
| 0 276 083 | 7/1988 | European Pat. Off. . |

*Primary Examiner*—James Derrington
*Attorney, Agent, or Firm*—Kees van der Sterre

[57] ABSTRACT

A honeycomb extrusion die comprising a die body incorporating an inlet face, a discharge face opposite the inlet face, a plurality of feedholes extending from the inlet face into the body, and an intersecting array of discharge slots extending into the body from the discharge face to connect with the feed holes, the intersecting array of discharge slots being formed by the side surfaces of a plurality of pins bounded by the slots and extending into the die body from the discharge face, wherein at least some of the side surfaces of the pins incorporate at least one geometrically designed flow-modifying surface discontinuity.

16 Claims, 3 Drawing Sheets

MODIFIED SLOT EXTRUSION DIE

This application claims the benefit of U.S. Provisional Application No. 60/062,309, filed Oct, 17, 1997, entitled "Modified Slot Extrusion Die", by Mark A. Shalkey.

BACKGROUND OF THE INVENTION

The present invention relates to extrusion dies for the continuous extrusion of fine structures from plasticized materials, and more particularly to honeycomb extrusion dies comprising improved discharge slot designs imparting more uniform and stable extrusion characteristics to the dies.

The manufacture of inorganic honeycomb structures from plasticized powder batches comprising inorganic powders dispersed in appropriate binders is well known. U.S. Pat. Nos. 3,790,654, 3,885,977, and 3,905,743 describe dies, processes and compositions for such manufacture, while U.S. Pat. Nos. 4,992,233 and 5,011,529 describe honeycombs of similar cellular structure extruded from batches incorporating metal powders.

The manufacture of extrusion dies for the production of ceramic honeycombs by these methods requires extremely precise machining. To supply material to the slotted honeycomb discharge section of such a die, the inlet or supply face of the die is provided with multiple apertures or feed holes through which the plasticized batch material to be extruded is forced under high pressure. The opposing or discharge face of the die is provided with a crisscrossing array of finely machined discharge slots, these slots being cut into the discharge section of the die and intersecting the feed hole array. It is these discharge slots which shape the plasticized batch supplied to the bases of the slots by the feed holes into the interconnecting wall structure of an extruded honeycomb.

The islands of material between the intersecting discharge slots, which form the actual discharge face of the die, are sometimes referred to as "pins", since they appear as free-standing metal posts extending outwardly from the die interior and are attached to the die body only at their bases. The shapes of these pins define the shapes of the honeycomb channels formed by the extruding plasticized batch.

A number of techniques have been employed to shape metal billets into honeycomb extrusion dies. For softer steels, the feedhole array can be formed by mechanical drilling and the discharge slots by sawing. However, if the die is to be formed of harder, slower wearing materials such as stainless steels, electrochemical machining and electrical discharge machining are more widely used.

In the electrochemical machining (ECM) process, also referred to as the STEM (Shaped Tube Electrolyte Machining) process, the feed hole apertures are formed through a controlled deplating (dissolution) of the electrically conductive steel workpiece. An electrolytic cell is formed wherein the drill comprises the negatively charged electrode (cathode), the workpiece comprises the positively charged electrode (anode), and the electrolyte is a flowing electrically conductive fluid.

In die slotting by electrical discharge machining (EDM) the discharge slots are formed through an electrical discharge maintained between a long, thin, traveling electrode wire and the metal die preform. Slot lengths formed by wire EDM in these dies are generally greater than about 3½ inches, with slot depths of 0.1 inches or more and slot widths of 0.012 inches or less.

EDM is well suited for the shaping of thin slots with parallel sidewalls in these dies. The slots are typically substantially free of burrs and have a relatively smooth and consistent surface finish. Reference to U.S. Pat. Nos. 2,526,423, 4,205,213, 4,233,486, 4,403,131 and 4,527,035 may be made for further descriptions of EDM processing.

Although ECM and EDM remain important processes for the machining of large arrays of fine apertures and discharge slots in steel blanks for honeycomb extrusion dies, problems with the resulting dies still remain. These are usually manifested as an uneven flow of material as the honeycomb preform is extruded from the discharge face of the die. Uneven flow effects, such as "fast flow" (accelerated extrusion through localized regions of a die), can produce a variety of honeycomb product defects. These include "swollen" or "rippled" webs, i.e., cell walls distorted in transverse and/or longitudinal directions due to the extrusion of excess material, as well as other variations in cell dimensions, cell shapes, and cell wall thicknesses.

Surface finish irregularities within the feed hole and/or discharge slot sections of these extrusion dies are considered to be major contributors to uneven flow. Such irregularities can be caused by very slight variations in electrical voltage, current, or other discharge conditions during the machining process, these changing from aperture to aperture and slot to slot across the inlet and outlet faces of the die. These variations cannot at present be fully controlled.

Efforts to substitute alternative machining processes for the more conventional processes used for die fabrication, in order to optimize feed hole and/or slot consistency and surface finish, have not solved these problems either. For example, slotting through the use of an abrasive wheel cutting process in place of the more conventional EDM slotting process, while not subject to process disruptions from variations in electrical discharge conditions, also failed eliminate extrudate flow variations even though slot finish was smoother and slot shape variability was reduced.

SUMMARY OF THE INVENTION

The present invention provides honeycomb extrusion die designs offering significant improvements in flow uniformity and stability. These improvements result from the use of modified slot designs which appear to "mask" smaller finish irregularities and thereby remove many of the harmful effects of small variations in slot geometry and surface finish, variations which cannot be economically eliminated by conventional machining methods.

The modified slot designs of the invention are produced by impressing a "macro" geometric feature on the side surfaces of the pins forming the discharge slots. Although the presence of this feature on selected pin side surfaces can somewhat increase the flow impedance of the dies, such increases are more than offset by the very substantial reductions in extrudate flow front variations. These reductions in turn substantially reduce product defects such as swollen or undulating web (channel wall) surfaces in the honeycomb products caused by flow variations through the dies. Still other benefits of the modified slot design are more fully described below.

In a first aspect, then, the invention includes a "modified slot" honeycomb extrusion die. This die, which in other respects may be entirely conventional, comprises a die body incorporating an inlet face, a discharge face opposite the inlet face, and a plurality of feedholes extending from the inlet face into the body. The die further includes an intersecting array of discharge slots extending into the die body from the discharge face, these slots being formed or bounded by the side surfaces of the plurality of pins filling inter-slot spaces on the discharge face of the die. As is conventional, the slots and adjacent pins extend inwardly into the die body from the discharge face so that the bases of the slots connect with the feed holes in a manner permitting fluid flow from the feedholes into the slots.

To secure the flow improvements characteristic of the extrusion dies of the invention, one or more side surfaces of at least some of the pins incorporate at least one geometrically designed flow-modifying surface discontinuity, i.e., a macroscopic discontinuity in surface flatness on one or more sides of the pins. In contradistinction to the "micro" (microscopic) imperfections present on the side surfaces of conventionally machined pins, the "macro" geometric pin features of the invention typically have sizes of the same order of magnitude as the widths of the discharge slots themselves. They may in principle consist of any geometric surface discontinuity, such as a surface recess or depression, a raised surface portion, or a combination thereof, provided the discontinuity is of a size sufficient to modify the flow of extrudable material through the slots.

In a second aspect the invention offers an improved extrusion process which employs the modified flow characteristics of the die of the invention to form extruded honeycombs with fewer shape defects attributable to flow variations imparted by the die. As in conventional methods for forming a plasticized batch material into a honeycomb shape, the batch material is first forced into a feed hole array in an inlet face of the honeycomb extrusion die, and is then caused to flow thorough the feed holes and out of the die through a slotted discharge section. The discharge section comprises an interconnecting array of criss-crossing slots formed in the discharge face of the die.

As already noted, the criss-crossing slots in the discharge section border on and define an array of pins terminating at the discharge face, the side surfaces of these pins constituting the forming surfaces which shape the plasticized batch material into the honeycomb as that material exits the die. In the method of the invention, the flow of material through these discharge slots is altered as it traverses one or more geometrically designed flow-modifying surface discontinuities provided on one or more side surfaces of at least some of the pins.

As will hereinafter be more fully described, causing the batch material to traverse a slot array which incorporates these "macro" geometric features on slot sidewalls significantly alters the character of the extrusion process. Most importantly, the problem of "fast flow" encountered in more conventionally designed extrusion dies is substantially alleviated.

DESCRIPTION OF THE DRAWINGS

The invention may be further understood by reference to the drawings, wherein.

DETAILED DESCRIPTION

Figure 1:
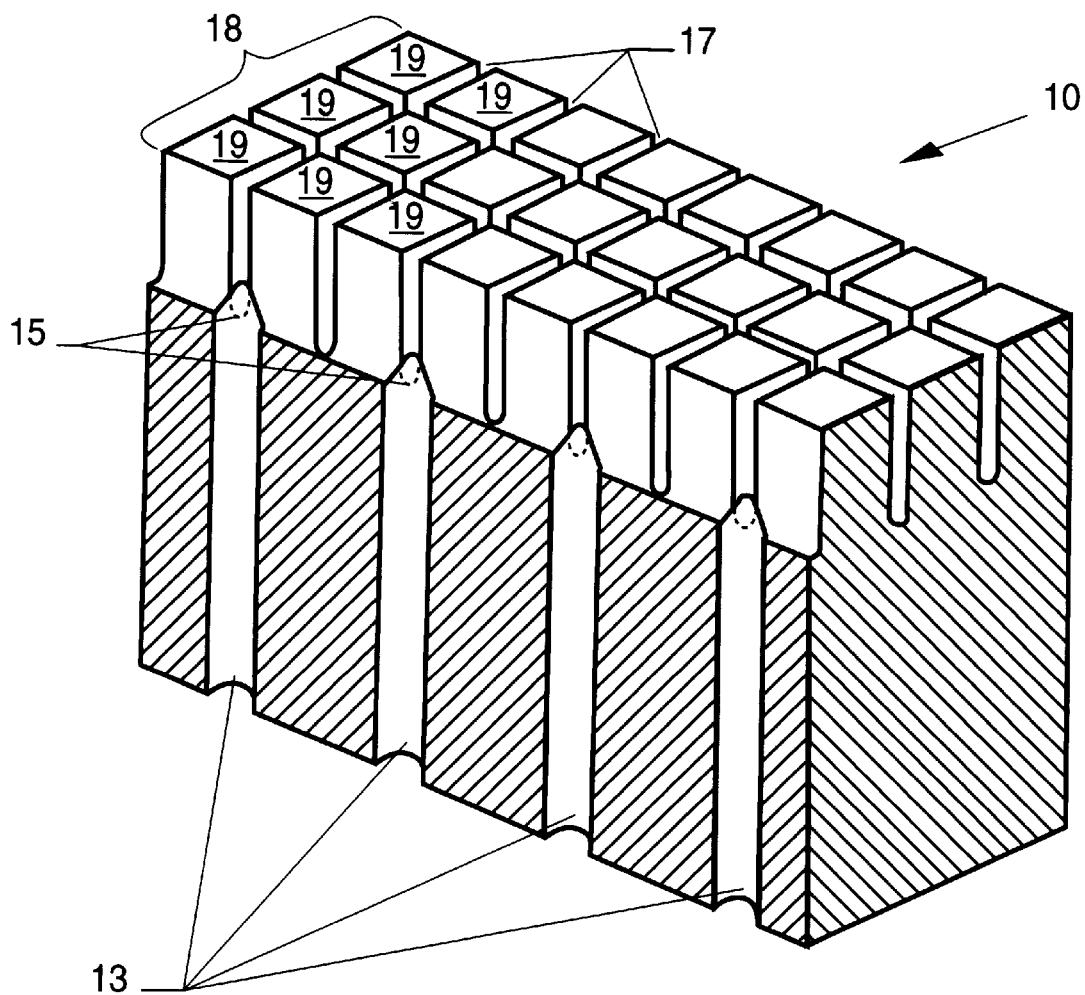
FIG. 1 is a schematic perspective view in partial cross-section of a section of a conventional honeycomb extrusion die.

Referring more particularly to the drawing, FIG. 1 is a schematic perspective view in partial cross-section of a section of a conventional honeycomb extrusion die of the kind employed in the art for the extrusion of ceramic honeycombs. As shown in that figure, extrusion die 10 comprises feed holes 13 extending upwardly from a die inlet face (not shown) by means of which extrudable batch material is conveyed to feed hole/slot intersections 15, and from there into discharge slots 17. Discharge slots 17 then convey the batch material upwardly to discharge face 18 of the extrusion die where it exits the die in the configuration of a honeycomb.

As will be apparent from a study of FIG. 1, discharge slots 17 are bounded or formed by the side surfaces of pins 19, the latter being formed as the discharge slots are formed. It is the side surfaces of pins 19 which form the walls of the slots and thus the walls of the honeycomb shapes as the batch material is extruded from the die.

Figure 2:
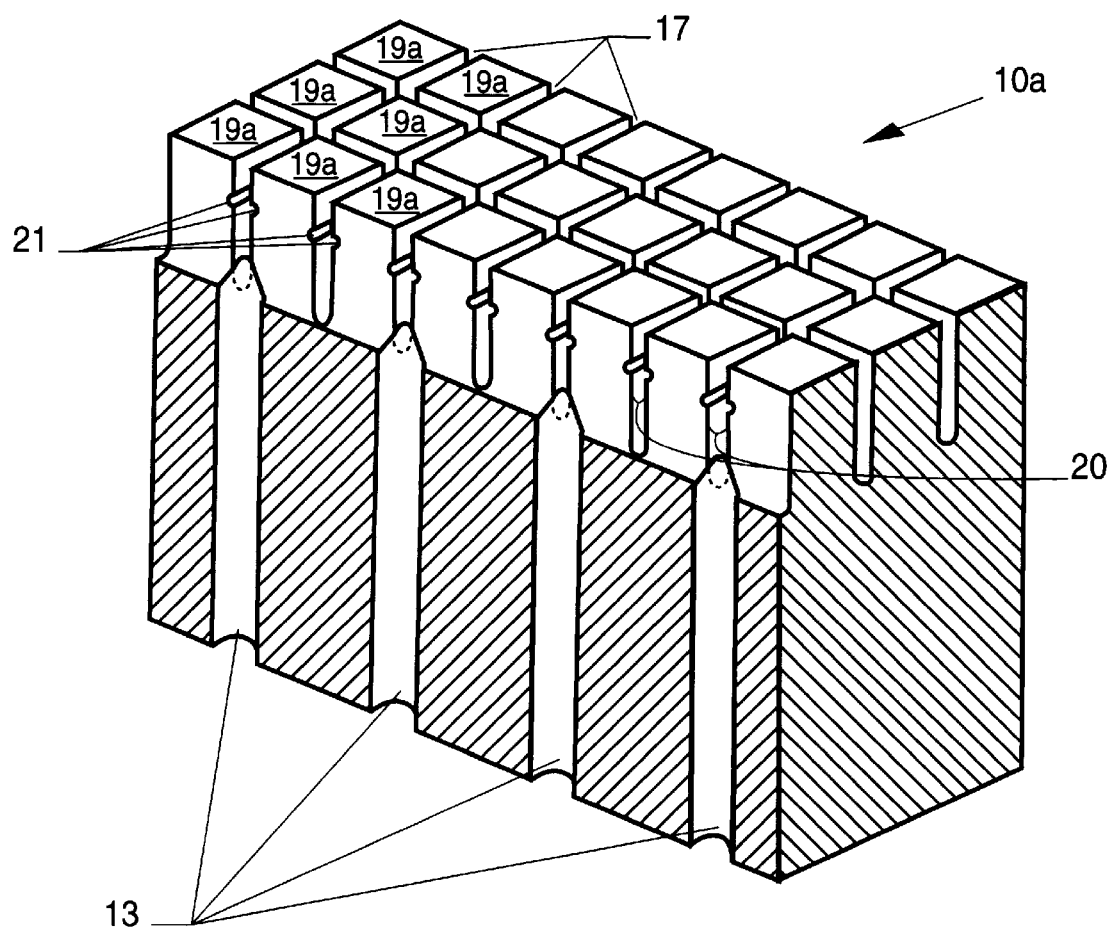
FIG. 2 is a schematic perspective view in partial cross-section of a section of a honeycomb extrusion die incorporating geometric slot features in accordance with the invention.

FIG. 2 of the drawing is a schematic perspective view in partial cross-section of a section of a honeycomb extrusion die provided in accordance with the invention. In that Figure, extrusion die 10a again comprises feed holes 13 extending upwardly from the die inlet face and which intersect with discharge slots 17 at the base of the discharge section of the die. In this embodiment of the invention, however, pins 19a bounding discharge slots 17 incorporate side surfaces 20 which include geometrically designed surface features 21 for modifying the flow of extrudable material past the die. Features 21, in this embodiment, are grooves or recesses formed in selected side surfaces of pins 20 which act to introduce shear within the extrudable material, thereby somewhat impeding its flow past the pin surfaces incorporating the recess. As also shown in FIG. 2, features 21 are spaced away from both the discharge face of the die formed by the top surfaces of pins 19a, and also from the feed hole/slot intersections formed between feedholes 13 and discharge slots 17 within the body of the die.

For the purpose of the present description, a "geometrically designed" feature is a feature of a predetermined size and shape impressed upon a pin or slot surface of the honeycomb extrusion die. This is in contradistinction to random surface variations of the kind typically present in the slot regions of extrusion dies machined in accordance with prior practice.

The flow modifications which will develop in the plasticized batch material due to the presence of geometrically designed features in the discharge slots will depend not only on the number, size and shape of the features, but also on factors such as the rheology of the material being extruded and the extrusion rates employed. However, the optimum feature geometry for any particular batch material, honeycomb shape, and/or extrusion condition may readily be determined by routine experiment.

For batch rheologies of the kind currently encountered in the production of extruded ceramics, and particularly for extruded ceramic honeycombs, the most effective features tried appear to be those having a maximum dimension of length (parallel to the extrusion direction) or height/depth (perpendicular to the pin surface) which is roughly the same as, or within one order of magnitude of, the slot width dimension of the extrusion die, the latter dimension ordinarily falling within the range of about 0.001–0.010 inches. In this slot width range, the length of a typical feature measured parallel to the direction of extrusion will most preferably be in the range of 100–200% of the slot width.

In the particular case of a recessed surface feature, the determination of optimum feature depth may involve a consideration of the maximum particle size present in the powder mixture making up the plasticized powder batch to be extruded. The preferred recess depths will usually be adequate to accept and retain even the largest powder particles present in the batch; for typical ceramic batches, recesses in the 0.002–0.005 inches will generally be adequate for this purpose. Of course, larger and/or smaller surface features may have equal or superior utility for applications where other batch rheologies and/or compositions are required to be extruded.

Recess designs such as shown in FIG. 2 of the drawing have an advantage over protrusion designs in that the flow modifications which develop are thought to arise from batch-to-batch drag effects; batch material trapped in the recesses tends to impede or retard the flow of adjacent batch material traversing the slots. Drag effects of this type will tend to remain relatively constant over the life of the extrusion die, whereas geometric features which protrude from pin side surfaces will tend to be altered by the abrasive wear effects typically seen in these dies. In the latter case the performance of the feature is more likely to change over time. A further and somewhat unexpected aspect of the performance of the feature arrangement of FIG. 2 is that the inclusion of grooves only on one (e.g., horizontal) set of pin surfaces, and not on the transverse or vertical pin surfaces, does not appear to adversely affect honeycomb integrity or cell wall geometry in any way.

Figure 3:
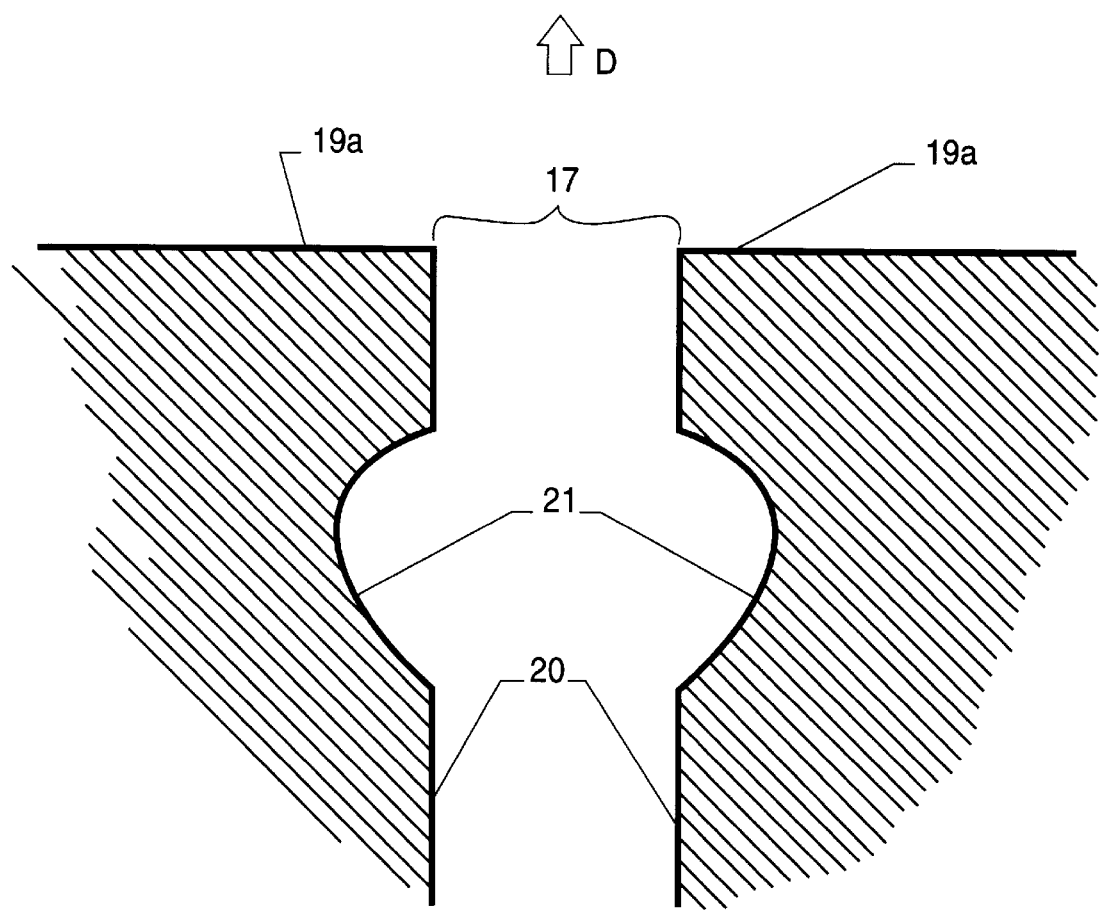
FIG. 3 is shows a design for a typical geometric surface feature used in accordance with the invention.

One specific embodiment of a profile for a geometric design of the recessed type is shown in FIG. 3 of the drawing. FIG. 3 shows a partial schematic cross-sectional view of the pin region of an extrusion die taken through two adjacent pins 19a in a plane transverse to the direction of a discharge slot 17. In that embodiment, teardrop-shaped entities 21 are cut into opposing side surfaces 20 of the selected pair of pins, i.e., on both sidewalls of the selected slot. The designation of teardrop shape applies to the groove cross-section when viewed in a plane parallel to the flow of material and perpendicular to the pin side surface. Machining of the feature involves forming the teardrop shape in mirror image about the centerline of the slot.

A teardrop-shaped recess or depression of this type can readily be formed by wire EDM cutting in dies wherein the slots are pre-formed. Alternatively, pins having this particular feature design can be set upon a pre-drilled die base using procedures known in the art. The teardrop feature shape has the advantage of allowing easy fill at the start of extrusion when carried out in the direction of arrow D in FIG. 3. At the same time, this feature shape is able to maintain a static batch pocket for relatively constant shear during the course of the ensuing extrusion.

The depth location of the features within the discharge slots does not appear to have a large effect on feature performance. Trials with recess features of the type shown in FIG. 3, but located at 5 times, 9.5 times and 14 times the slot width dimension away from the discharge face of the die, appear to offer approximately equivalent extrusion performance. Therefore, the precise location of the features within the slots may be selected based on other considerations, such as pin wear rate, the latter tending to favor feature positions closer to the discharge face than to the bases of the pins.

The method selected to form the features on the side surfaces of the pins will depend on the feature design and location selected. In the case of recess features such as shown in the drawing, EDM machining constitutes an effective way to form grooves of controlled size and shape in pin side surfaces along the entire lengths of selected slots. A specific illustration of such a machining technique is presented in the following Example, which is intended to be illustrative of the invention rather than limiting.

EXAMPLE

A steel honeycomb extrusion die having a conventional configuration such as shown in FIG. 1 of the drawing is first selected. The die selected is designed for the production of square-cell honeycomb bodies having about 400 square channels per square inch of honeycomb cross-sectional area. Each of the discharge slots on the discharge surface of the die has a slot width of about 0.007 inches and a slot depth of about 0.100 inches.

To form a recess feature on the side surfaces of the pins in the discharge section of this die, the die is placed in the carriage of a wire EDM machine and an EDM wire of 0.004 inches diameter is mounted on the machine for wire cutting. The cutting of grooves in the sides of rows of pins forming the slots of the discharge section is then commenced.

The grooves are cut in a teardrop shape on opposing pin side surfaces in all of the slots of the die, i.e., on all four sides of each pin in the discharge outlet array. The profile of the grooves is substantially as shown in FIG. 3 of the drawing.

The maximum depth of each groove is about 0.002 inches, and the grooves are positioned approximately 0.036 inches below the slot openings on the discharge face of the die. No corrections of other slot defects related to potential extrusion problems, such as minor incidental variations in slot width or similarly minor variations in slot surface finish of the type seen in conventional slotting processes, are made.

The extrusion performance of this die is evaluated through extrusion trials with a plasticizer ceramic batch material containing clay, talc and alumina mixed with organic binders in a water vehicle. Initially observed is a slight increase in flow impedance through the die, when compared with conventional dies with smooth slots. Notwithstanding this increase, continuation of the extrusion trials demonstrates that a substantial reduction in "fast flow" product defects in honeycombs produced from the die is achieved.

The reduction in product defect levels is best quantified by the finding that the service life of the die, as measured by the volume of acceptably defect-free extruded honeycomb product produced therefrom, is 2 to 3 times the service life of a conventionally slotted honeycomb die of otherwise similar design. Thus, in addition to an immediate reduction in the incidence of "fast flow" defects, a considerable decrease in unit honeycomb manufacturing cost, due to the large reduction in the number of dies required for the extrusion of a standard volume of product, is achieved.

I claim:

1. A honeycomb extrusion die comprising a die body incorporating an inlet face, a discharge face opposite the inlet face, a plurality of feedholes extending from the inlet face into the body, and an intersecting array of discharge slots extending into the body from the discharge face to connect with the feed holes at feed hole/slot intersections within the die, the intersecting array of discharge slots being formed by the side surfaces of a plurality of pins bounded by the slots and extending into the die body from the discharge face, wherein at least some of the side surfaces of the pins forming the walls of the slots incorporate at least one geometrically designed, macroscopic, flow-impeding surface discontinuity spaced away from the feedhole/slot intersection of the die.

2. A honeycomb extrusion die in accordance with claim 1 wherein the surface discontinuity is a surface protrusion or surface recess.

3. A honeycomb extrusion die in accordance with claim 2 wherein the surface discontinuity has a maximum dimension of length, height, or depth that is equal to or within one order of magnitude of the slot width dimension of the die.

4. A honeycomb extrusion die in accordance with claim 2 wherein the surface discontinuity is a surface recess.

5. A honeycomb extrusion die in accordance with claim 4 wherein the surface recess is a surface groove running parallel to the discharge face.

6. A honeycomb extrusion die in accordance with claim 5 wherein the groove spans a dimension, in the direction of extrusion from the die, which is in the range of 100–200% of the slot width.

7. A honeycomb extrusion die in accordance with claim 5 wherein the groove ha s a depth in the range of about 0.002–0.005 inches.

8. A honeycomb extrusion die in accordance with claim 5 wherein the groove has a teardrop-shaped cross-section in a plane parallel to the flow of material and perpendicular to the pin side surface.

9. In the method for forming a plasticized batch material into a honeycomb shape which comprises forcing the material into a feed hole array in an inlet face of a honeycomb extrusion die and flowing the material through the die past feed hole/slot intersections within the die for discharge as a honeycomb shape from a criss-crossing array of discharge slots on a discharge face of the die, the discharge slots being formed by the side surfaces of an array of pins terminating at the discharge face, the improvement wherein the flow of material through the discharge slots is impeded by one or more geometrically designed, macroscopic, flow-modifying surface discontinuities provided on at least some of the side surfaces of the pins forming the walls of the slots at locations space away from the feed hole/slot intersections of the die.

10. A method in accordance with claim 9 wherein the flow of material through the discharge slot is altered by a surface protrusion or surface recess in the side surfaces of the pins.

11. A method in accordance with claim 10 wherein the surface protrusion or surface recess has a maximum dimension of length, height, or depth that is equal to, or within one order of magnitude of, the slot width dimension of the die.

12. A method in accordance with claim 10 wherein the flow of material is altered by a surface recess.

13. A method in accordance with claim 10 wherein the surface recess is a surface groove running parallel to the discharge face.

14. A method in accordance with claim 13 wherein the groove has a dimension in the direction of material flow which is in the range of 100–200% of the slot width.

15. A method in accordance with claim 13 wherein the groove has a depth in the range of about 0.002–0.005 inches.

16. A method in accordance with claim 13 wherein the groove has a teardrop-shaped cross-section in a plane parallel to the flow of material and perpendicular to the pin side surface.

* * * * *